US012644064B2

(12) United States Patent
Robbins

(10) Patent No.: US 12,644,064 B2
(45) Date of Patent: Jun. 2, 2026

(54) METHODS OF BLENDING OFF TRANSMIX INTO GASOLINE STREAMS

(71) Applicant: Texon Midstream, LLC, Houston, TX (US)

(72) Inventor: John Colin Robbins, Houston, TX (US)

(73) Assignee: Texon Midstream, LLC, Houston, TX (US)

( * ) Notice: Subject to any disclaimer, the term of this patent is extended or adjusted under 35 U.S.C. 154(b) by 199 days.

(21) Appl. No.: 18/650,084

(22) Filed: Apr. 30, 2024

(65) Prior Publication Data

US 2024/0384190 A1     Nov. 21, 2024

Related U.S. Application Data

(63) Continuation of application No. 18/135,187, filed on Apr. 17, 2023, now Pat. No. 11,999,916.

(60) Provisional application No. 63/335,041, filed on Apr. 26, 2022.

(51) Int. Cl.
*C10L 1/08*     (2006.01)
*G05D 11/13*     (2006.01)

(52) U.S. Cl.
CPC .............. *C10L 1/08* (2013.01); *G05D 11/139* (2013.01); *C10L 2200/0423* (2013.01); *C10L 2200/043* (2013.01); *C10L 2200/0446* (2013.01); *C10L 2200/0461* (2013.01); *C10L 2290/143* (2013.01); *C10L 2290/24* (2013.01); *C10L 2290/58* (2013.01); *C10L 2290/60* (2013.01)

(58) Field of Classification Search
CPC .............. C10L 1/08; C10L 2200/0423; C10L 2200/043; C10L 2200/0446; C10L 2200/0461; C10L 2290/143; C10L 2290/24; C10L 2290/58; C10L 2290/60; C10L 1/04; G05D 11/139; G05D 21/02
See application file for complete search history.

(56) References Cited

U.S. PATENT DOCUMENTS

| | | | |
|---|---|---|---|
| 11,441,088 B2 | 9/2022 | Robbins et al. | |
| 2008/0000836 A1 | 1/2008 | Wang et al. | |
| 2020/0291316 A1* | 9/2020 | Robbins | .............. G05D 11/138 |

FOREIGN PATENT DOCUMENTS

| | | | | |
|---|---|---|---|---|
| WO | 2007124058 A2 | 11/2007 | | |
| WO | 2010083077 A1 | 7/2010 | | |
| WO | 2014065886 A2 | 5/2014 | | |
| WO | WO-2018017528 A1 * | 1/2018 | .............. | F17D 3/05 |
| WO | 2018148087 A1 | 8/2018 | | |

OTHER PUBLICATIONS

Applications,Gas Liquid Identification Analysis and Sampling, JP3 Measurement, LLC, 2020, Austin, TX, 6 pp.

(Continued)

*Primary Examiner* — Ellen M McAvoy
*Assistant Examiner* — Chantel Graham
(74) *Attorney, Agent, or Firm* — Clark G. Sullivan

(57) ABSTRACT

Methods for blending transmix containing distillates such as diesel fuel into certified gasoline streams that can be burned in internal combustion engines without affecting the certification of the gasoline or the efficiency or operability of the engine.

24 Claims, 1 Drawing Sheet

(56) References Cited

OTHER PUBLICATIONS

Kumar, Devika Krishna and Hampton, Liz, Colonial Pipeline Plan to Cut off Dirty Jet Fuel Could Hit Airlines, Reuters, 2017, 33 pp.
United States Environmenta Protection Agency, Regulatory Announcement, Refiner and Importer Quality Assurance Requirements for Downstream Oxygenate Blending and Requirements for Pipeline Interface, Office of Transportation and Air Quality, EPA420-F-06-039May 2006, 7 pp.
Jiskoot Quality Systems, In-Line Blending Systems, Cameron International Corp, BB-001-1101-4, 2011, 8 pp.
Jiskoot Quality Systems, Ratio4 Blending Calculator, Cameron International Corp, 2014, 2 pp.
Jones, et al., Use an Integrated Two-Tower Process to Separate Transmix, Increasing complexities and variations of fuels challenge distilling pipeline byproducts imto gasoline and diesel-fuel products, Reprinted from: Hydrocarbon Processing magazine, May 2000, p. 85-89.
Application Note: Verax, Loading Terminal Measurement, JP3 Measurement, LLC, Austin, TX,2 pp.
VeraSIGHT Optical Flow Cell, In-Line Multi-Stream Measurement of Hydrocarbon Composition, API Gravity, Vapor Pressure, BTU, and Other Properties in Natural Gas, NGL, Condensate, Crude Oil and Refined Products, JP3 Measurement, LLC, 2016, Austin, TX, 2 pp.
Verax SSG Analyzer, Single-Stream Measurement of Hydrocarbon Composition, BTU, Relative Density and Other Properties for Natural Gas, JP3 Measurement, LLC, Verax SSG Technical Specs, Mar. 2016, Austin, TX, 2 pp.

Verax SSL Analyzer, Single-Stream Analysis for Crude, Condensate, Natural Gas Liquids and Refined Products, JP3 Measurement, LLC, Verax SSL Technical Specs, Mar. 2018, Austin, TX, 2 pp.
Verax VPA, Vapor Pressure Analyzer (RVP, VPCRx, & TVP) for Crude Oil, Condensate, NGL, and Refined Fuels, JP3 Measurement, LLC, Nov. 2017, Austin, TX, 2 pp.
Application Note: Verax VPA, Vapor Pressure: RVP, TVP, VPCRx, JP3 Measurement, LLC, Austin, TX,2 pp.
Pantoja et al, Application of Near-Infrared Spectroscopy to the Characterization of Petroleum, Analytical Characterization Methods for Crude Oil and Related Products, First Edition, John Wiley & Sons Ltd. Published 2018, 23 pp.
Sindie Analyzer, XOS, 1 pg.
Sindie on Line, XOS, Sulfur Process Analyzer for Petroleum Fuels, X-Ray Optical Systems, Inc., 2007, New York, 4 pp.
Thermo Schientific: SOLA II Sulfur Online Analyzer, Thermo Fisher Scientific, 2015, 4 pp.
Auers, John R. et al., Economic and Supply Impacts of a Reduced Cap on Gasoline Sulfur Content, Prepared for the American Petroleum Institute by Turner, Mason & Company, Dallas, Feb. 2013, 52 pp.
Ultraclean Fuel considers that there are a number of specific market opportunities available to it that will suit the Ultrex® Process, Ultraclean Fuel Ltd., 2017 4 pp.
US EIA Definitions, U.S. Energy Information Administration, 3 pp.
Verax SSG/SSL, Verax SSG and SSL are cost e ective single stream optical analyzers for the oil and gas industry, Verax SSG Spec Sheet, JP3 Measurement, LLC, Austin, TX,2020, 3 pp.
Verax VPA, Verax VPA™ is the first optical, online, real-time, vapor pressure analyzer for crude, condensate and NGL streams available to the Oil & Gas industry, JP3 Verax VPA Spec Sheet, JP3 Measurement, LLC, Austin, TX,2020, 4 pp.

* cited by examiner

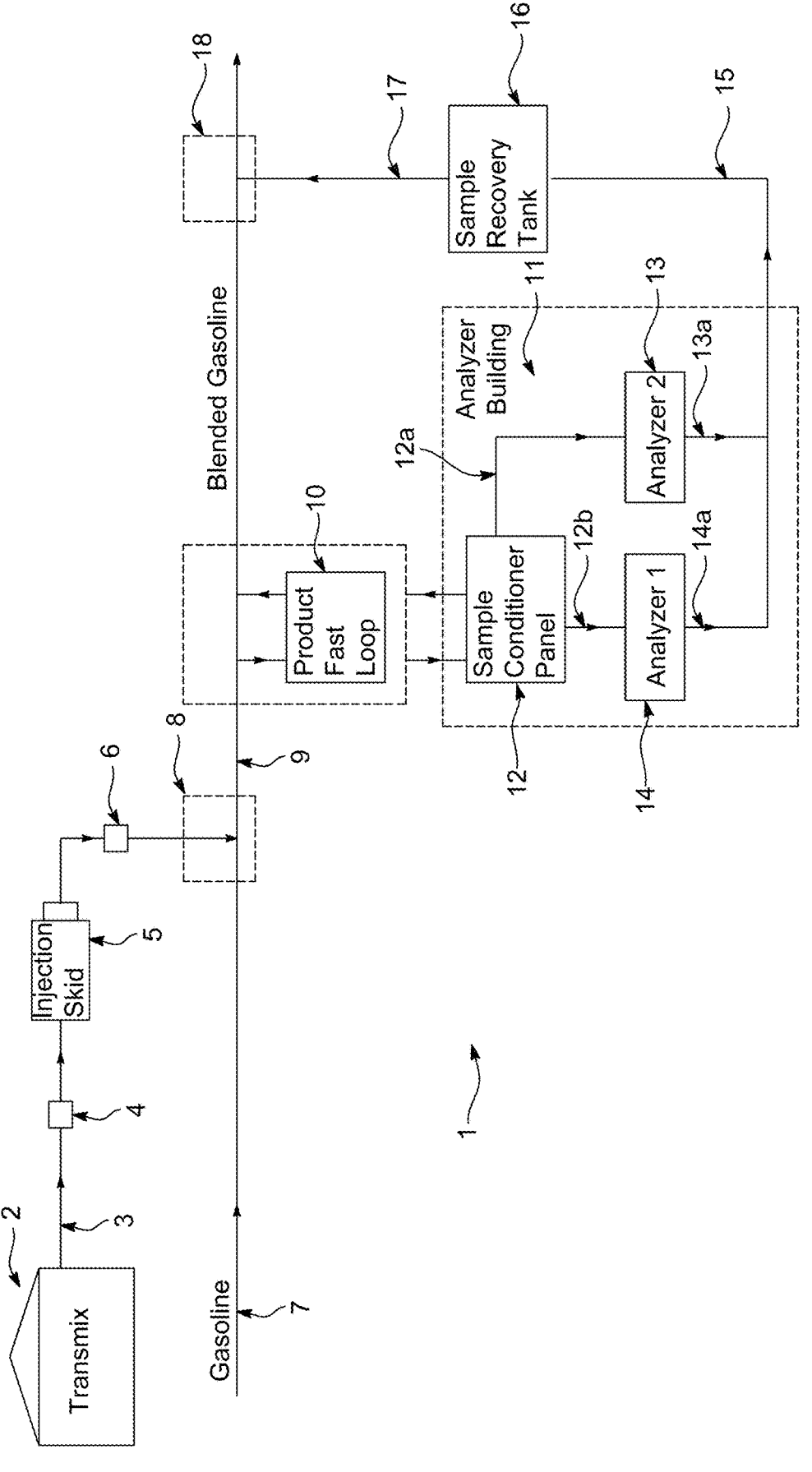

METHODS OF BLENDING OFF TRANSMIX INTO GASOLINE STREAMS

FIELD OF INVENTION

The present invention relates to methods for blending off transmix into gasoline using controlled blending techniques. Methods have surprisingly been developed that allow transmix containing diesel and other distillate fuels to be blended into certified gasoline streams, that can be burned in internal combustion engines without further modification, without affecting the certification of the gasoline or the efficiency or operability of the engine.

BACKGROUND OF INVENTION

Transmix is created when products of different specifications are shipped sequentially on a pipeline. The pipeline operator might ship a volume of distillate (aviation turbine fuel or Ultra Low Sulfur Diesel, etc.) followed by a volume of gasoline intended for automobiles. When these two products meet in the pipeline at an interface, a quantity of off-specification product referred to as transmix is created. Because no mechanical buffer is used to prevent the two products from mixing and becoming contaminated at this interface, the transmix does not meet approved specifications for most fuel products and cannot be used in commerce without further processing.

In the United States, pipelines ship motor gasoline, diesel fuel, jet fuel, naphthas, LPG, diluent, butane, propane, pentane, and other hydrocarbon products on the same clean pipeline. Both refineries and petroleum terminals ship on these common carrier pipelines in varying sizes or batches. A batch is the volume of a product shipped on the pipeline meeting a pre-defined set of product specifications. The pipeline companies and various regulatory authorities publish product specifications that shippers on the pipeline are required to meet before introducing their products into the pipeline. The pipeline company must ensure that the products it eventually releases into commerce meet these specifications. Shippers must provide a certified analysis of products they introduce to the pipeline verifying that their products satisfy the relevant specifications.

All multi-product pipelines create a volume of transmix that is not marketable for use in commerce. This transmix may be composed, for example, of previously certified gasoline (including previously certified gasoline blendstocks that become commercial gasoline solely upon the addition of an oxygenate), distillate fuel (such as diesel, aviation fuel, kerosene and heating oils), and other certified product types. Problems from the creation of transmix are particularly acute when diluents, ultra-low sulfur diesel, aviation turbine fuel, and gasoline are shipped next to each other.

The United States Environmental Protection Agency ("EPA") defines interface and transmix in regulations at 40 C.F.R. 80.84, and prescribes processes that pipeline operators must follow to dispose of transmix. Transmix must typically be re-processed before it can once again be marketed in commerce. The value of transmix is thus lower than the hydrocarbon products from which the transmix derives, and it is in the commercial interest of pipelines and pipeline shippers to minimize this transmix.

Presently, pipeline operators monitor the specific gravity, flash point, haze and color of batched products to determine when transmix is present and when on-specification products are in the pipeline. Based on their standard operating procedures, the pipeline operator will direct the transmix to a transmix storage tank when it reaches a particular juncture on the pipeline, where it can be stored for eventual shipment to a transmix processing plant. Once the transmix has been completely diverted from the pipeline, and on-specification products are once again flowing past this juncture, the operator will resume the product flow through the pipeline and direct the on-specification product to other tanks in the tank farm for eventual distribution to customers and in commerce.

Transmix diverted from the pipeline is commonly processed either on-site or off-site by separating the distillate fraction from the gasoline fraction, typically via distillation. The distillate fraction will commonly include different types of distillate that the pipeline has carried, and the gasoline fraction will commonly include different types of gasoline that the pipeline has carried. Once separated, these fractions are occasionally added back to tanks of distillate or gasoline at a tank farm. When these transmix fractions are added to a fuel tank that has previously been certified for compliance with applicable specifications, the product in the tank must often be recertified. This recertification process includes several specifications, most especially for sulfur, which can be introduced to the transmix pool by high-sulfur content fuels such as aviation fuel, fuel oils, or high sulfur diesel. Even though the sulfur in transmix pools derives principally from distillate streams, the sulfur can contaminate both distillate and gasoline fractions and thereby limit the amounts of transmix distillate and transmix gasoline that can be blended back into certified fuels. See Robbins et al., U.S. Publication 2020/0291316 A1 (published Sep. 17, 2020).

Jones J. D. et al., Hydrocarbon Processing (May 2000 Issue) pp. 85-89, describes an integrated two tower process in which the first tower separates transmix into diesel and gasoline fractions, and the second tower separates the diesel into high sulfur and low sulfur fractions. The publication mentions that the transmix fractions can be blended into on-specification products, but it does not give any detail on how such blending would work.

EPA Regulatory Announcement 420-F-06-039 (May 2006), discusses quality assurance requirements for transmix, particularly as they relate to RBOB, and notes that transmix is occasionally blended back into gasoline in very small percentages (<0.25%), at locations where it is inconvenient or too expensive to send the transmix to a processing facility.

Thermo Scientific, SOLAR II Sulfur Online Analyzer (accessed at https://assets.thermofisher.com/TFS-Assets/LSG/Specification-Sheets/D10617~.pdf on Jan. 17, 2018), discloses the SOLAR II Sulfur Online Analyzer, and states that the analyzer "enables petroleum refiners to make timely process adjustments to enhance the economic efficiency of desulfurization and fuel blending operations."

X-Ray Optical Systems, Sindie® On-Line Sulfur Analyzer (accessed at https://www.bartec.de/ProdCatalogue/Assets/Datasheets/Ing_0/Sindie_E.pdf on Jan. 17, 2018), discloses the Sindie® On-Line Sulfur Analyzer and states that the analyzer is useful for "Pipeline terminals: interface cuts and tank contamination prevention," including "Continuous monitoring with programmable response times: −10 seconds: ideal for pipeline interface cuts."

Jiskoot Quality Systems, In Line Blending Systems (accessed at http://www.jiskoot.com/files/1114/1691/7164/BB001_In_Line_Blending.pdf on Jan. 17, 2018), discloses: "Diesel blending: Higher specification, lower cost diesel can be produced by in-line blending. Blenders can be designed to take major components directly from process units to minimize intermediate tank storage. Using analyzers for Sulphur and the blended diesel can be produced to an exact environmental specification."

Jiskoot Quality Systems, Ratio Blending Calculator (accessed at http://www.jiskoot.com/services/calculations/ratio-blending-index/on Jan. 17, 2018), discloses: "This on-line calculator, which is designed for blending two liquid hydrocarbons, will assist you to develop the optimal blend ratio and specification for your application. It will calculate the blend ratio (volume or mass) required to achieve target blend density, viscosity or sulphur parameters based on component specifications."

Mattingly et al., WO 2007/124058 (published Nov. 1, 2007), discloses versatile systems for continuous blending of butane into petroleum streams, and further discloses a sulfur sampling and monitoring unit that ensures that the supply of butane does not exceed specified limitations for sulfur in butane that is blended into gasoline. The sampling unit "removes samples of butane from the butane supply line preferably at least once every 500,000 gallons, and the sulfur content of the samples is determined either off-line in a laboratory, or in-line using an automated sulfur monitor that allows the butane is returned to the butane supply line after testing."

What is needed are methods and systems for recycling transmix back into commercial fuel streams without causing the commercial fuel streams to violate pre-specified limits on applicable physical properties. Ideally, the methods and systems could be performed continuously, and the recipient commercial fuel stream could be continuously certified post-blending to confirm the fuel stream meets applicable standards and specifications.

Accordingly, it is an object of the current invention is to blend transmix, even transmix contaminated by diesel fuel, into commercial gasoline streams, in a manner that does not compromise the performance of the resulting gasoline.

SUMMARY OF THE INVENTION

After intensive research and investigation, the inventors have developed versatile systems and methods for blending transmix contaminated by distillate into gasoline streams that comply with applicable ASTM standards and industry specifications, before and after the blending.

Thus, in a first principal embodiment, the invention provides a system for blending off distillate transmix into a gasoline stream without violating a physical property limit on the gasoline comprising: (a) a gasoline stream comprising a gasoline flow rate; (b) a transmix stream in fluid communication with the gasoline stream comprising distillate and a transmix flow rate; (c) a blended stream comprising a combination of the transmix stream and the gasoline stream comprising a blended flow rate, a blended value for the physical property, and distillate; (d) an IPU on which is stored the physical property limit, programmed to calculate a ratio or rate at which the transmix stream can be added to the gasoline stream based on the physical property limit and a measured value for the physical property of the blended stream; (e) a sampler and a physical property analyzer at a sampling point on the blended stream in electronic communication with the IPU, electronically configured to withdraw samples from the blended stream, measure the physical property of the blended stream, and transmit or make accessible the measured physical property to the IPU; and (f) a flow regulator interposed between the transmix and gasoline streams, in electronic communication with the IPU, electronically configured to receive or access the rate or ratio from the IPU and adjust the transmix flow rate without exceeding the rate or ratio.

In a second principal embodiment the invention provides a method for blending off distillate transmix into a gasoline stream to produce a blended stream without violating a pre-determined limit on a physical property on the gasoline stream comprising: (a) withdrawing samples periodically from the blended stream, measuring the physical property of the blended stream by an analyzer, and transmitting or making accessible via electronic communication the physical property measurement to an IPU; (b) calculating on the IPU a ratio or rate at which the transmix stream can be added to the gasoline stream based on the physical property limit and the physical property measurement of the blended stream; and (c) communicating the ratio or rate to a flow regulator, and adjusting a rate of flow of the transmix stream through the flow regulator into the gasoline stream without exceeding the rate or ratio.

Additional advantages of the invention are set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

A better understanding of the present invention can be obtained when the following detailed description of the disclosed embodiments is considered in conjunction with the following drawings, in which:

FIG. 1 is a plan layout of a petroleum tank farm suitable for blending transmix contaminated with distillate into certified gasoline streams.

DETAILED DESCRIPTION

Definitions and Use of Terms

Throughout this application, various publications are referenced. The disclosures of these publications in their entireties are hereby incorporated by reference into this application in order to more fully describe the state of the art to which this invention pertains. The references disclosed are also individually and specifically incorporated by reference herein for the material contained in them that is discussed in the sentence in which the reference is relied upon.

As used in the specification and claims, the singular forms a, an, and the include plural references unless the context clearly dictates otherwise. For example, the term "a specification" refers to one or more specifications for use in the presently disclosed methods and systems. "A hydrocarbon" includes mixtures of two or more such hydrocarbons, and the like. The word "or" or like terms as used herein means any one member of a particular list and also includes any combination of members of that list.

As used in this specification and in the claims which follow, the word "comprise" and variations of the word, such as "comprising" and "comprises," means "including but not limited to," and is not intended to exclude, for example, other additives, components, integers or steps. When an element is described as comprising one or a plurality of components, steps or conditions, it will be understood that the element can also be described as "consisting of" or "consisting essentially of" the component, step or condition, or the plurality of components, steps or conditions.

When used herein the term "about" will compensate for variability allowed for in the petroleum industry and inherent in hydrocarbon products. Whenever the term "about is used, it will be understood that the term can be substituted in alternative embodiments by 5% or 10% to allow for any variation within 5% or 10% of the recited specification or standard.

When percentages, concentrations or other units of measure are given herein, it will be understood that the units of measure are weight percent unless otherwise stated to the contrary.

When flow rates are expressed herein, or relative flow rates such as percent additions are expressed herein, it will be understood that the flow rate is a volumetric flow rate unless otherwise stated.

When ranges are expressed herein by specifying alternative upper and lower limits of the range, it will be understood that the endpoints can be combined in any manner that is mathematically feasible. Thus, for example, a range of from 50 or 80 to 100 or 70 can alternatively be expressed as a series of ranges of from 50 to 100, from 50 to 70, and from 80 to 100. When a series of upper bounds and lower bounds are related using the phase "and" or "or", it will be understood that the upper bounds can be unlimited by the lower bounds or combined with the lower bounds, and vice versa. Thus, for example, a range of greater than 40% and/or less than 80% includes ranges of greater than 40%, less than 80%, and greater than 40% but less than 80%.

When an element of a process or thing is defined by reference to one or more examples, components, properties or characteristics, it will be understood that any one or combination of those components, properties or characteristics can also be used to define the subject matter at issue. This might occur, for example, when specific examples of an element are recited in a claim (as in a Markush grouping), or an element is defined by a plurality of characteristics. Thus, for example, if a claimed system comprises element A defined by elements A1, A2 and A3, in combination with element B defined by elements B1, B2 and B3, the invention will also be understood to cover a system defined by element A without element B, a system in which element A is defined by elements A1 and A2 in combination with element B defined by elements B2 and B3, and all other possible permutations.

"ASTM" refers to the American Society for Testing and Materials. Whenever a petroleum subtype is referenced herein, it will be understood that the subtype is defined by its normally accepted meaning, and that it can also be more specifically defined by specifications and testing methods prescribed by ASTM in its various publications. Thus, for example, aviation turbine fuel can be defined with reference to ASTM 1655-15del, and diesel fuels can be defined with reference to ASTM D975-15c. When a product is defined by an ASTM standard for a particular petroleum subtype, it will be understood that the product need not have been tested according to the ASTM standard to satisfy the standard. Unless otherwise indicated, when reference is made to an ASTM standard herein, it is made in reference to the ASTM standard in effect on Jan. 1, 2022, and the ASTM standard is incorporated herein by reference.

The term "distillate" as used herein refers to those fuels commonly referred to as "middle distillates" in the petroleum industry. "Middle distillates" is a term commonly assigned to petroleum products obtained in the "middle" boiling range from about 180° C.-360° C. during the process of crude oil distillation. They are also called middle distillates because the products are removed at mid-height in the distillation tower during the multi-stage process of thermal separation. A middle distillate is typically a clear, colorless to light yellow, combustible liquid. It typically has between eleven and eighteen carbon atoms, a density of not more than 0.876 kg/l at 15° C., and a flashpoint above 38° C. Middle distillates primarily include diesel fuel, marine fuels, aviation turbine fuel, non-aviation turbine fuel, heating oil, and kerosene. In all cases where the term is used, a distillate stream, or a type of distillate stream such as a diesel stream, refers to a stream of distillate transmitted through a common carrier petroleum pipeline, that satisfies the specifications imposed by the common carrier and applicable to common carriage.

The term "distillate transmix" refers to any transmix that contains both gasoline and transmix and is contaminated by distillate at any of the distillate percentages recited herein.

"Diesel fuel" and "finished diesel fuel" are used synonymously herein, and refer to a petroleum-derived liquid fuel used in diesel engines, whose fuel ignition takes place without any spark as a result of compression of the inlet air mixture and injection of fuel. Diesel fuel is a mixture of hydrocarbons with boiling points typically in the range of 200 to 380° C. Diesel fuel utilized in the present invention preferably satisfies the testing requirements specified in ASTM D975. "Ultra-low sulfur diesel" refers to diesel having a sulfur content less than 15 ppm. "Low sulfur diesel" refers to diesel having a sulfur content less than 500 ppm.

"Finished gasoline" and "finished motor gasoline" are used synonymously, and refer to gasoline that is suitable for burning in spark-ignition vehicles without further modifications. Finished gasoline will typically satisfy ASTM Specification D 4814 or Federal Specification VV-G-1690C, and is characterized as having a boiling range of 122 to 158 degrees fahrenheit at the 10 percent recovery point to 365 to 374 degrees fahrenheit at the 90 percent recovery point.

"Gasoline" and "motor gasoline" are used synonymously. Gasoline is a complex mixture of relatively volatile hydrocarbons with or without small quantities of additives, blended to form a fuel suitable for use in spark-ignition engines. The term includes finished gasoline, as well as fuels that are intended to be mixed with oxygenates such as ethanol and MTBE. Gasoline thus includes conventional gasoline; oxygenated gasoline such as gasohol; reformulated gasoline; reformulated blendstock for oxygenate blending; conventional blendstock for oxygenate blending; and aviation gasoline. In all cases, the gasoline is downstream of a petroleum refinery and satisfies specifications imposed by pipeline carriers of commercial fuels.

"Conventional Blendstock for Oxygenate Blending" or "CBOB" means motor gasoline blending components intended for blending with oxygenates to produce finished conventional motor gasoline.

"Reformulated Blendstock for Oxygenate Blending" or "RBOB" refers to motor gasoline blending components intended for blending with oxygenates to produce finished reformulated motor gasoline.

"Premium Blendstock for Oxygenate Blending" or "PBOB" refers to motor gasoline blending components intended for blending with oxygenates to produce premium finished reformulated motor gasoline.

"Conventional Gasoline" means finished motor gasoline not included in the oxygenated or reformulated gasoline categories. The term thus excludes RFG, RBOB, CBOB, and blendstocks.

"Reformulated Gasoline (RFG)" refers to finished gasoline formulated for use in motor vehicles, the composition and properties of which meet the requirements of the reformulated gasoline regulations promulgated by the U.S. Environmental Protection Agency under Section 211 (k) of the U.S. Clean Air Act and in effect on Jan. 1, 2019. Reformulated gasoline excludes Reformulated Blendstock for Oxygenate Blending (RBOB).

"Aviation Gasoline," or "Avgas" is a complex mixture of relatively volatile hydrocarbons with or without small quantities of additives, blended to form a fuel suitable for use in aviation spark-ignition engines. Avgas comes in several grades, all manufactured to an ASTM standard (D910), with specific physical properties and specific permitted and required additives (such as Tetra-Ethyl Lead-TEL).

"Fluid communication" refers to the linkage of a pipe to a source of a fluid at the same facility. Optionally the linkage may be through a channel that can be closed or whose flow may be modulated as by a valve. The linkage may be by any of the following: a door or window on the side of the pipeline; a branching pipe in the pipeline; an injection-facilitating fixture in a joint of the pipeline; a smaller secondary pipe that extends into the interior of the pipeline; or any other means that permits a fluid to flow into the pipeline. Optionally the flow may be constant, variable, or intermittent. Thus, a first stream that is separate from a transmix stream by a storage tank at the same facility would still be considered to be in fluid communication with the first stream. In certain preferred embodiments of the invention the fluid flow into the pipe by means of this linkage is capable of being modulated or stopped.

"Tank farm" means any facility that contains a number of large storage tanks for petroleum products, one or more pipelines originating off-site for delivering petroleum products to the tank farm, and typically including loading racks from which tanker trucks can be filled. The methods and systems of the current invention will commonly occur at a tank farm. A tank farm of the present invention will be downstream of a petroleum refinery.

"Informational database" or "IDB" refers to a data storing system which can receive, store and output data. The informational database communicates with or is accessible to other informational database(s), IPU(s), component(s), system(s) and device(s) encompassed by the methods and systems of the present invention. When an IDB is modified by the term "an," it will be understood that the invention contemplates that one or more IDB's may perform the function described for the IDB. In like manner, when text refers to two or more IDBs for performing distinct functions, without specifically stating that the IDBs are different, it will be understood that the two or more IDBs can be the same or different.

"Information processing unit" and "IPU" means a computational unit that is useful for at least one of accessing, receiving, processing, distributing and storing data. The IPU may receive data either passively or by affirmatively soliciting or searching for data on a separate information system. When an IPU is modified by the term "an," it will be understood that the invention contemplates that one or more IPU's may perform the function described for the IPU; that the same IPU can perform more than one of the functions described for IPUs in the relevant text; and that the functions described for IPUs in the relevant text can be distributed among multiple IPUs. Thus, when text refers to two or more IPUs for performing distinct functions, without specifically stating that the IPUs are different, it will be understood that the two or more IPUs can be the same or different.

When data or a signal is referred to herein as being transmitted between two IPUs or an IPU and an information database, or other words of like import such as "communicated" or "delivered" are used, it will be understood that the transmission can be indirect, as when an intermediate IPU receives and forwards the signal or data. It will also be understood that the transmission can be passive or active.

"Obtaining" data or other information means acquiring such information. In some embodiments information is obtained by making physical measurements. In other embodiments information is obtained by receiving measurement data from a separate source.

Discussion of Principal Embodiments

The invention can be defined based on several principal embodiments which can be combined in any manner physically and mathematically possible to create additional principal embodiments. In a first principal embodiment, the invention provides a system for blending off distillate transmix into a gasoline stream without violating a physical property limit on the gasoline comprising: (a) a gasoline stream comprising a gasoline flow rate; (b) a transmix stream in fluid communication with the gasoline stream comprising distillate and a transmix flow rate; (c) a blended stream comprising a combination of the transmix stream and the gasoline stream comprising a blended flow rate, a blended value for the physical property, and distillate; (d) an IPU on which is stored the physical property limit, programmed to calculate a ratio or rate at which the transmix stream can be added to the gasoline stream based on the physical property limit and a measured value for the physical property of the blended stream; (e) a sampler and a physical property analyzer at a sampling point on the blended stream in electronic communication with the IPU, electronically configured to withdraw samples from the blended stream, measure the physical property of the blended stream, and transmit or make accessible the measured physical property to the IPU; and (f) a flow regulator interposed between the transmix and gasoline streams, in electronic communication with the IPU, electronically configured to receive or access the rate or ratio from the IPU and adjust the transmix flow rate without exceeding the rate or ratio.

In a second principal embodiment the invention provides a method for blending off distillate transmix into a gasoline stream to produce a blended stream without violating a pre-determined limit on a physical property on the gasoline stream comprising: (a) withdrawing samples periodically from the blended stream, measuring the physical property of the blended stream by an analyzer, and transmitting or making accessible via electronic communication the physical property measurement to an IPU; (b) calculating on the IPU a ratio or rate at which the transmix stream can be added to the gasoline stream based on the physical property limit and the physical property measurement of the blended stream; and (c) communicating the ratio or rate to a flow regulator, and adjusting a rate of flow of the transmix stream through the flow regulator into the gasoline stream without exceeding the rate or ratio.

Discussion of Subembodiments

The invention can further be understood with reference to various subembodiments which can modify any of the principal embodiments. It will be understood that these subembodiments can be combined in any manner that is both mathematically and physically possible to create additional subembodiments, which in turn can modify any of the principal embodiments. It will also be understood that any of the features of the methods of the present invention apply equally to the systems of the present invention, and vice versa. However, certain verbiage can be employed in the description of the systems of the present invention, which is more appropriate when defining a system.

In any of the embodiments of the present invention, the physical property used to control the rate of blending into gasoline streams are selected from octane, distillation temperature, Reid vapor pressure, sulfur concentration, and combinations thereof. In a particularly preferred embodiment, physical property limits are established for all four physical properties, and the rate of blending is controlled to prevent violation of any of the four limits. In another particularly preferred embodiment, chemometrics (as discussed further below) are used to measure one or more of the physical properties, often using one chemometric dataset for more than one of the physical properties that are controlling the blending.

A particular advantage of the invention is the ability to blend large percentages of transmix into gasoline, even when that transmix is contaminated by a significant percentage of distillate, without affecting the efficiency or performance of the vehicle in which the fuel is eventually burned or the certification of the gasoline into which the transmix is blended. The transmix is preferably contaminated by a distillate selected from diesel fuel, marine fuel, aviation turbine fuel, non-aviation turbine fuel, heating oil, kerosene, and combinations thereof, most preferably diesel fuel in the percentages expressed herein.

In any of the embodiments of the present invention:

the transmix stream can comprise greater than 10% distillate; and the transmix can be blended into the gasoline stream at a rate equal to or greater than 0.25%, 0.5%, 1%, 2%, or 3%, and typically less than 10%, or 5%.

the transmix stream can comprise greater than 20% distillate; and the transmix can be blended into the gasoline stream at a rate equal to or greater than 0.25%, 0.5%, 1%, 2%, or 3%, and typically less than 10%, or 5%.

the transmix stream can comprise greater than 35% distillate; and the transmix can be blended into the gasoline stream at a rate equal to or greater than 0.25%, 0.5%, 1%, 2%, or 3%, and typically less than 10%, or 5%.

the transmix stream can comprise greater than 50% distillate; and the transmix can be blended into the gasoline stream at a rate equal to or greater than 0.25%, 0.5%, 1%, 2%, or 3%, and typically less than 10%, or 5%.

the transmix stream can comprise greater than 5%, 10%, 20%, 35%, 50%, or 80% distillate.

the transmix stream can preferably comprise greater than 50% distillate.

the transmix can be blended into the gasoline stream at a rate equal to or greater than 0.25%, 0.5%, 1%, 2%, or 3%.

the transmix can preferably blended into the gasoline stream at a rate equal to or greater than 0.5%.

The blending can occur along a variable fuel transmission pipe (a/k/a multi-product common carrier pipeline) that transmits a plurality of different petroleum types, including gasoline (regular and premium), diesel fuel (various grades), heating oil, and/or aviation fuel. Alternatively, the blending can occur inside a pipe that is dedicated to the transmission of a particular fuel type. In one embodiment, the blending occurs in a circulatory loop, in a pipe that exits and returns to the same petroleum tank.

In a preferred embodiment, the system will be installed on a pipeline that transmits multiple batches of different fuel types. Blending will occur into gasoline streams but stopped when blend prohibited streams are passing the blend point. Generally any non-gasoline stream defined herein will trigger a stop blend signal, but certified diesel streams and ultra-low sulfur diesel streams are particularly to be avoided. Thus, the methods will commonly be employed to blend into multiple gasoline types, and the gasoline stream will comprise a plurality of batches selected from the group consisting of regular finished gasoline, premium finished gasoline, conventional blendstock for oxygenate blending, reformulated blendstock for oxygenate blending, premium blendstock for oxygenate blending, reformulated gasoline, and aviation gasoline.

The flow rate of the gasoline stream can remain unchanged over time or it can vary. When the rate varies, measurements will preferably be taken of the gasoline stream flow rate (or, by proxy, the blended stream rate) in real time, and the transmix addition rate calculated based on the actual flow rate of the gasoline stream.

The rate at which the transmix is added to the gasoline stream is preferably determined by the relative pressures of the gasoline and transmix at the flow regulator, with the transmix pressure higher than the gasoline pressure. The pressure of the transmix is preferably under the control of a coordinated pump and valve system, as depicted in greater detail in the figures hereto.

Some subembodiments are directed toward the location at which the samples are returned to the system. Thus, in one subembodiment, the methods of the present invention comprise returning the samples to the gasoline upstream of the gasoline sampling point, and the systems comprise piping configured to accomplish this return.

The transmix will commonly comprise middle distillates selected from diesel fuel, marine fuels, aviation turbine fuel, non-aviation turbine fuel, heating oil, and kerosene, and gasolines selected from conventional gasoline, oxygenated gasoline, reformulated gasoline, reformulated blendstock for oxygenate blending, conventional blendstock for oxygenate blending, and aviation gasoline. Most commonly the transmix will comprise a combination of gasoline subtypes and a combination of distillate subtypes. The transmix might also comprise subgrade gasoline, diluent, propane, pentane, butane, and combinations thereof. In various subembodiments, the transmix will comprise greater than 20, 50, 100, 250, or even 500 ppm sulfur.

In the systems and methods of the current invention, the transmix will typically have a sulfur concentration greater than the sulfur concentration of the gasoline stream. The sulfur concentration in the transmix can in various embodiments be more than 110%, 120%, 150%, 250%, 500%, 1,000%, 2,500%, or even 5,000% of the sulfur concentration of the gasoline stream into which the transmix is blended. The transmix can in various embodiments be blended into the gasoline stream at rates greater than 0.2%, 0.25%, 0.5%, 1%, 2%, or 5%, of the flow rate of the gasoline stream, typically less than 10% or 5% of the flow rate of the gasoline stream.

The systems are particularly versatile, and allow transmix that comprises different types of petroleum within the same range of boiling points to be blended into a single stream type. Thus, transmix can be blended into a gasoline stream even though the transmix might comprise marine fuel, aviation turbine fuel, non-aviation turbine fuel, heating oil, kerosene, or a combination thereof, and the transmix might comprise more than 250, 500, 1,000, 2,000, or even 5,000 ppm sulfur.

In like manner distillate transmix including two or more types of gasoline might be blended into a gasoline stream. Thus, for example, distillate transmix comprising two or more types of gasoline selected from conventional gasoline, oxygenated gasoline, RFG, RBOB, CBOB, and aviation gasoline, can be blended into a gasoline stream selected from conventional gasoline, oxygenated gasoline, RFG, RBOB, CBOB, and aviation gasoline.

The sampler is typically located on the blended fuel stream after the transmix has been blended with the gasoline stream downstream of the flow regulator, in what is known as a feedback control system. When a plurality of physical property limits are imposed on the blended gasoline stream, and all are at risk of being violated, the blended fuel will typically be measured for each of the physical properties, the amount of transmix which can be added without violating the physical properties will be calculated for each of the physical properties, and the lowest rate calculated will be used as the maximum rate of addition for the transmix stream. Methods for determining the rate at which transmix can be added to a gasoline stream without violating pre-set physical properties are well known in the art and described, for example, in WO 2020/185837 A1 to Robbins et al, and U.S. Pat. No. 8,176,951 B1 to Mattingly et al., and U.S. Pat. No. 9,080,111 B1 to Huff et al. The method does not need to be perfect because, if the physical property is slightly exceeded by the increased addition, it will be quickly corrected during the next round of physical property measurements. For this reason, volumetric averaging can be the simplest and most practical technique for making such determinations.

Downstream monitoring is also well adapted to the generation of records which document the rate of addition or amount of sulfur in the blended stream, or other physical properties of the gasoline stream post-blending. Thus, in one subembodiment the systems and methods further comprise measuring an actual downstream sulfur content or other physical property in the blended stream, associating in an information database the resulting actual downstream sulfur content or other physical property with a time point to provide associated temporal data; recording the associated temporal data in an informational database; and periodically repeating the process. In one particular subembodiment, the time point is received in the information database from an external source.

One or more of these physical properties can be monitored, depending on the type of petroleum, preferably at a frequency of at least every 10 minutes, five minutes, 60 seconds, 30 seconds, 15 seconds, or 10 seconds, and regardless of the physical property being monitored. The hydrocarbon is preferably analyzed by: (a) withdrawing a sample of the hydrocarbon from the stream; (b) transmitting the sample to an analyzing unit; and (c) either returning the sample to system, or transmitting the sample to a separate storage unit.

Near Infra-Red (NIR) Spectroscopy

NIR spectroscopy is an everyday tool used by the oil and gas industry. NIR does not require any specific sample preparation, requires short acquisition time, and allows performing an online measurement in a non-intrusive way.

This is critical for the oil and gas industry since the product, as crude oil or refined fuel, remains almost its entire lifetime in pipelines.

To perform an NIR online measurement there are two possibilities. Either an immersion probe or a flow cell is used. Immersion probes are most widely used for Fourier transform near infrared (FT-NIR) measurements in process control and can work in a transmission mode or a reflection depending on the transmittance of the sample. For crude oil, reflectance will be typically used, while, for refined fuels, transmission can be the most appropriate. Besides immersion probes, flow cells are widely used. In this case, the sample flows directly through the cell where the spectrum is measured and measurement is done exclusively in transmission mode. Typically, a flow cell probe allows one to acquire the spectra of a fluid flowing in a pipeline at a high pressure, while the immersion probe is designed to measure at pressures close to atmospheric.

A large number of properties are measured with NIR spectroscopy these days at refineries with the final goal of ensuring quality or optimizing the production process.

Those properties include, without limitation, RON (research octane number), MON (motor octane number), cetane index, % aromatics, % olefins, % benzene and % oxygenates, to RVP (Reid vapor pressure), D10%, D50%, D90%, Pour Point, Cloud Point, and Cold Filter Plugging Point or E170. Suitable NIR analyzers are the OMA 300 by Applied Analytical, having a spectral range of 400-1100 nm, ANALECT® PCM™ Series by Applied Instrument Technologies, having a spectral range of 833-8333 nm, the HP260X by ABB, having a spectral range of 714-2630 nm, the XDS Process Analytics™ by FOSS NIR Systems Inc., having a spectral range of 800-2200 nm, and the PetroScan™ by Light Technology Industries, Inc., having a spectral range of 1200-2400 nm.

Chemometrics

"Chemometrics" is a term applied to the generic discipline containing computers and mathematics to derive meaningful chemical information from samples of varying complexity (Workman, J. J., Jr (2008) NIR spectroscopy calibration basic. In: Burns, D. A. and Ciurczak, E. W. (eds), Handbook of Near-Infrared Analysis, 3rd edn. CRC Press, Boca Raton, FL). In chemometrics, a computer is tasked with interpreting NIR spectra from a plurality of samples using a variety of multivariate mathematical techniques. These techniques are used to produce a mathematical calibration model.

In routine NIR analysis, the spectra should be pretreated to enhance informative signals of the interested components and reduce uninformative signals as much as possible (Pantoja P A et al., Application of Near-Infrared Spectroscopy to the Characterization of Petroleum, in Analytical Characterization Methods for Crude Oil and Related Products, First Edition. Edited by Ashutosh K. Shukla. Published 2018 by John Wiley & Sons Ltd.). Smoothing, multiplicative scatter correction, mean centering, and Savitzky-Golay derivation are commonly applied to pretreat the spectra before modeling in order to remove the scattering effect created by diffuse reflectance and to decrease baseline shift, overlapping peak, and other detrimental effects on the signal-to-noise ratio (Boysworth, M. K. and Booksh, K. S. (2008) Aspects of multivariate calibration applied to near-infrared spectroscopy. In: Burns, D. A. and Ciurczak, E. W. (eds), Handbook of Near-Infrared Analysis, 3rd edn. CRC Press, Boca Raton, FL).

NIR spectra are ultimately calibrated to relate the observed spectra, in a predictive manner, to a property of interest. With calibration it is possible to predict relevant physicochemical properties of an unknown hydrocarbon that compare accurately with reference information on these properties. In the process of this invention, the reference information is generated from pipeline samples taken simultaneously with spectral information on the pipeline to generate a chemometric dataset. The main calibration methods, as described by López-Gejo et al., 2008, include principal component analysis (PCA), partial least squares (PLS) regression, and artificial neural networks (ANNs) (López-Gejo, J., Pantoja, P. A., Falla, F. S., et al. (2008) Electronical and vibrational spectroscopy. In: Petroleum Science Research Progress, Publisher, Inc., 187-233).

Thus, in other methods and systems of the present invention, the distillation value for said physical property is obtained by generating a spectral response of said blended gasoline stream using absorption spectroscopy with a near infrared analyzer, and comparing said spectral response to a chemometric dataset specific for said physical property in said blended stream.

In other methods and systems of the present invention, the octane value for said physical property is obtained by generating a spectral response of said blended gasoline stream using absorption spectroscopy with a near infrared analyzer, and comparing said spectral response to a chemometric dataset specific for said physical property in said blended stream.

In other methods and systems of the present invention, the Reed vapor pressure value for said physical property is obtained by generating a spectral response of said blended gasoline stream using absorption spectroscopy with a near infrared analyzer, and comparing said spectral response to a chemometric dataset specific for said physical property in said blended stream.

In still further methods and systems of the present invention, the chemometric dataset is built by taking two or more samples of a blended stream; measuring said physical property of the samples offline; simultaneously with taking the two or more samples, obtaining a spectral response of the blended gasoline in the pipeline using absorption spectroscopy with a near infrared analyzer; and correlating the spectral response with the measured physical property of the samples.

Discussion of Depicted Embodiments

Reference is made to FIG. 1 for a fuller understanding of the present invention. FIG. 1 is a plan layout of a petroleum tank farm/distribution facility that has installed a transmix recycling system 1 of the present invention for blending distillate transmix into gasoline.

Transmix recycling system 1 includes a transmix storage tank 2 where quantities of distillate transmix generated at the tank farm are stored. During operation, transmix is withdrawn from transmix storage tank 2 through transmix line 3, under the urging of a pump 4, before entering injection skid 5. At injection skid 5, the rate of transmix flow is governed by flow regulator 6 from which the transmix is ultimately injected or discharged into gasoline stream 7 at injection/discharge point 8.

Gasoline stream 7 will comprise a certified fuel stream that meets applicable ASTM standards. Gasoline stream 7 might originate on-site from another tank not shown in FIG. 1 or an off-site pipeline. The stream can carry any type of gasoline as defined in this document, including conventional gasoline, reformulated gasoline, CBOB, and RBOB, and will commonly carry multiple batches of different gasoline types.

The gasoline becomes a blended gasoline stream 9 after the distillate injection/discharge point 8. The blended gasoline stream is sampled and measured for relevant physical properties. In FIG. 1, the blended gasoline stream is periodically sampled and analyzed using a product fast loop 10 that circulates blended gasoline samples from and to blended gasoline line 9, and to and from dual sample conditioner panel 12 in analyzer building 11. Samples of blended gasoline are periodically forwarded from conditioner panel 12 to one or more analyzers through lines 12a and 12b for measuring the physical properties of the blended stream.

Two analyzers (13 and 14) are illustrated in FIG. 1, which preferably measure two or more physical properties selected from sulfur concentration, RVP, distillation temperature, and octane. It will be understood that more analyzers can be used depending on the capability of the analyzer and the number of physical properties tested. From analyzers 13 and 14, the samples are discharged into lines 13a and 14a, respectively, and subsequently recombined in stream 15, stored in sample recovery tank 16, and subsequently added back to blended gasoline stream 9, preferably when blended gasoline stream 9 comprises gasoline and even more preferably when blended gasoline stream 9 comprises the same type of gasoline as the samples.

Other Embodiments

[Embodiment 1] A system for blending off distillate transmix into a gasoline stream without violating a physical property limit on the gasoline comprising:

a) a gasoline stream comprising a gasoline flow rate;

b) a transmix stream in fluid communication with the gasoline stream comprising distillate and a transmix flow rate;

c) a blended stream comprising a combination of the transmix stream and the gasoline stream comprising a blended flow rate, a blended value for the physical property, and distillate;

d) an IPU on which is stored the physical property limit, programmed to calculate a ratio or rate at which the transmix stream can be added to the gasoline stream based on the physical property limit and a measured value for the physical property of the blended stream;

e) a sampler and a physical property analyzer at a sampling point on the blended stream in electronic communication with the IPU, electronically configured to withdraw samples from the blended stream, measure the physical property of the blended stream, and transmit or make accessible the measured physical property to the IPU; and f) a flow regulator interposed between the transmix and gasoline streams, in electronic communication with the IPU, electronically configured to receive or access the rate or ratio from the IPU and adjust the transmix flow rate without exceeding the rate or ratio.

[Embodiment 2] The system of embodiment 1, wherein the gasoline stream comprises a plurality of batches selected from the group consisting of regular finished gasoline, premium finished gasoline, conventional blendstock for oxygenate blending, reformulated blendstock for oxygenate blending, premium blendstock for oxygenate blending, reformulated gasoline, and aviation gasoline.

[Embodiment 3] The system of embodiment 1 or 2, wherein the gasoline stream comprises a plurality of batches of gasoline periodically separated by one or more batches of distillate.

[Embodiment 4] The system of embodiment 1 or 2, wherein the gasoline stream comprises a plurality of batches of gasoline periodically separated by one or more batches of distillate, further comprising programming that causes blending to cease when distillate is passing the flow regulator.

[Embodiment 5] The system of any of embodiments 1-4, wherein the transmix stream comprises greater than 5%, 10%, 20%, 35%, 50%, or 80% distillate.

[Embodiment 6] The system of any of embodiments 1-5, wherein the transmix stream comprises greater than 50% distillate.

[Embodiment 7] The system of any of embodiments 1-6, wherein the transmix is blended into the gasoline stream at a rate equal to or greater than 0.25%, 0.5%, 1%, 2%, or 3%.

[Embodiment 8] The system of any of embodiments 1-7, wherein the transmix is blended into the gasoline stream at a rate equal to or greater than 0.5%. [Embodiment 9] The system of any of embodiments 1-8, wherein the distillate is selected from diesel fuel, marine fuel, aviation turbine fuel, non-aviation turbine fuel, heating oil, kerosene, and combinations thereof.

[Embodiment 10] The system of any of embodiments 1-9, wherein the physical property is selected from octane, distillation temperature, Reid vapor pressure, sulfur concentration, and combinations thereof.

[Embodiment 11] The system of any of embodiments 1-10, wherein the physical property comprises a combination of octane, distillation temperature, Reid vapor pressure, and sulfur concentration.

[Embodiment 12] The system of any of embodiments 1-11, wherein said physical property is obtained by generating a spectral response of said gasoline stream, blended stream, and/or transmix stream using absorption spectroscopy with a near infrared analyzer, and comparing said spectral response to a chemometric dataset specific for said physical property in said gasoline stream, blended stream, and/or transmix stream.

[Embodiment 13] A method for blending off distillate transmix into a gasoline stream to produce a blended stream without violating a pre-determined limit on a physical property on the gasoline stream comprising:

a) withdrawing samples periodically from the blended stream, measuring the physical property of the blended stream by an analyzer, and transmitting or making accessible via electronic communication the physical property measurement to an IPU;

b) calculating on the IPU a ratio or rate at which the distillate transmix can be added to the gasoline stream based on the physical property limit and the physical property measurement of the blended stream; and c) communicating the ratio or rate to a flow regulator, and adjusting a rate of flow of the distillate transmix through the flow regulator into the gasoline stream without exceeding the rate or ratio.

[Embodiment 14] The method of embodiment 13, wherein the gasoline stream comprises a plurality of batches selected from the group consisting of regular finished gasoline, premium finished gasoline, conventional blendstock for oxygenate blending, reformulated blendstock for oxygenate blending, premium blendstock for oxygenate blending, reformulated gasoline, and aviation gasoline.

[Embodiment 15] The method of embodiment 13 or 14, wherein the gasoline stream comprises a plurality of batches of gasoline periodically separated by one or more batches of distillate.

[Embodiment 16] The method of embodiment 13 or 14, wherein the gasoline stream comprises a plurality of batches of gasoline periodically separated by one or more batches of distillate, further comprising ceasing blending when distillate is passing the flow regulator.

[Embodiment 17] The method of any of embodiments 13-16, wherein the transmix stream comprises greater than 5%, 10%, 20%, 35%, 50%, or 80% distillate.

[Embodiment 18] The method of any of embodiments 13-17, wherein the transmix stream comprises greater than 50% distillate.

[Embodiment 19] The method of any of embodiments 13-18, wherein the transmix is blended into the gasoline stream at a rate equal to or greater than 0.25%, 0.5%, 1%, 2%, or 3%.

[Embodiment 20] The method of any of embodiments 13-19, wherein the transmix is blended into the gasoline stream at a rate equal to or greater than 0.5%.

[Embodiment 21] The method of any of embodiments 13-20, wherein the distillate is selected from diesel fuel, marine fuel, aviation turbine fuel, non-aviation turbine fuel, heating oil, kerosene, and combinations thereof.

[Embodiment 22] The method of any of embodiments 13-21, wherein the physical property is selected from octane, distillation temperature, Reid vapor pressure, sulfur concentration, and combinations thereof.

[Embodiment 23] The method of any of embodiments 13-22, wherein the physical property comprises a combination of octane, distillation temperature, Reid vapor pressure, and sulfur concentration.

[Embodiment 24] The method of any of embodiments 13-23, wherein said physical property is obtained by generating a spectral response of said gasoline stream, blended stream, and/or transmix stream using absorption spectroscopy with a near infrared analyzer, and comparing said spectral response to a chemometric dataset specific for said physical property in said gasoline stream, blended stream, and/or transmix stream.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A system for blending distillate transmix into a gasoline stream without violating a physical property limit on the gasoline comprising:

a) a gasoline stream comprising a gasoline flow rate;

b) a transmix stream in fluid communication with the gasoline stream comprising distillate and a transmix flow rate;

c) a blended stream comprising a combination of the transmix stream and the gasoline stream comprising a blended flow rate, a blended value for the physical property, and distillate;

d) an IPU on which is stored the physical property limit, programmed to determine a ratio or rate at which the transmix stream can be added to the gasoline stream based on the physical property limit and a measured value for the physical property of the blended stream;

e) a physical property analyzer at a sampling point on the blended stream in electronic communication with the IPU, electronically configured to measure the physical property of the blended stream, and transmit or make accessible the measured physical property to the IPU; and f) a flow regulator interposed between the transmix and gasoline streams, in electronic communication with the IPU, electronically configured to receive or access the rate or ratio from the IPU and adjust the transmix flow rate without exceeding the rate or ratio.

2. The system of claim 1, wherein the gasoline stream comprises a plurality of batches selected from regular finished gasoline, premium finished gasoline, conventional blendstock for oxygenate blending, reformulated blendstock for oxygenate blending, premium blendstock for oxygenate blending, reformulated gasoline, and aviation gasoline.

3. The system of claim 1, wherein the gasoline stream comprises a plurality of batches of gasoline periodically separated by one or more batches of distillate.

4. The system of claim 1, wherein the gasoline stream comprises a plurality of batches of gasoline periodically separated by one or more batches of distillate, further comprising programming that causes blending to cease when distillate is passing the flow regulator.

5. The system of claim 1, wherein the transmix stream comprises greater than 20% distillate.

6. The system of claim 1, wherein the transmix stream comprises greater than 50% distillate.

7. The system of claim 1, wherein the transmix is blended into the gasoline stream at a rate equal to or greater than 0.25%.

8. The system of claim 1, wherein the transmix is blended into the gasoline stream at a rate equal to or greater than 0.5%.

9. The system of claim 1, wherein the distillate diesel fuel, marine fuel, aviation turbine fuel, non-aviation turbine fuel, heating oil, kerosene, or a combination thereof.

10. The system of claim 1, wherein the physical property is selected from octane, distillation temperature, Reid vapor pressure, sulfur concentration, and combinations thereof.

11. The system of claim 1, wherein the physical property comprises a combination of octane, distillation temperature, Reid vapor pressure, and sulfur concentration.

12. The system of claim 1, wherein said physical property is obtained by generating a spectral response of said gasoline stream, blended stream, and/or transmix stream using absorption spectroscopy with a near infrared analyzer, and comparing said spectral response to a chemometric dataset specific for said physical property in said gasoline stream, blended stream, and/or transmix stream.

13. A method for blending distillate transmix into a gasoline stream to produce a blended stream without violating a pre-determined limit on a physical property on the gasoline stream comprising:

a) measuring the physical property of the blended stream by an analyzer, and transmitting or making accessible via electronic communication the physical property measurement to an IPU;

b) calculating on the IPU a ratio or rate at which the distillate transmix can be added to the gasoline stream based on the physical property limit and the physical property measurement of the blended stream; and c) communicating the ratio or rate to a flow regulator, and adjusting a rate of flow of the distillate transmix through the flow regulator into the gasoline stream without exceeding the rate or ratio.

14. The method of claim 13, wherein the gasoline stream comprises a plurality of batches selected from regular finished gasoline, premium finished gasoline, conventional blendstock for oxygenate blending, reformulated blendstock for oxygenate blending, premium blendstock for oxygenate blending, reformulated gasoline, and aviation gasoline.

15. The method of claim 13, wherein the gasoline stream comprises a plurality of batches of gasoline periodically separated by one or more batches of distillate.

16. The method of claim 13, wherein the gasoline stream comprises a plurality of batches of gasoline periodically separated by one or more batches of distillate, further comprising ceasing blending when distillate is passing the flow regulator.

17. The method of claim 13, wherein the transmix stream comprises greater than 20% distillate.

18. The method of claim 13, wherein the transmix stream comprises greater than 50% distillate.

19. The method of claim 13, wherein the transmix is blended into the gasoline stream at a rate equal to or greater than 0.25%.

20. The method of claim 13, wherein the transmix is blended into the gasoline stream at a rate equal to or greater than 0.5%.

21. The method of claim 13, wherein the distillate comprises diesel fuel, marine fuel, aviation turbine fuel, non-aviation turbine fuel, heating oil, kerosene, or a combination thereof.

22. The method of claim 13, wherein the physical property is selected from octane, distillation temperature, Reid vapor pressure, sulfur concentration, and combinations thereof.

23. The method of claim 13, wherein the physical property comprises a combination of octane, distillation temperature, Reid vapor pressure, and sulfur concentration.

24. The method of claim 13, wherein said physical property is obtained by generating a spectral response of said gasoline stream, blended stream, and/or transmix stream using absorption spectroscopy with a near infrared analyzer, and comparing said spectral response to a chemometric dataset specific for said physical property in said gasoline stream, blended stream, and/or transmix stream.

* * * * *